United States Patent [19]

Timmer et al.

[11] Patent Number: 4,653,632

[45] Date of Patent: Mar. 31, 1987

[54] ENDLESS, AGRICULTURAL, BELTED-CHAIN CONVEYOR WITH PROVISION FOR ATTACHING CROP-PROTECTING, SPROCKET-RUN COVERS

[76] Inventors: George R. Timmer, Forest, Guernsey CI, England; Scott W. Brown, Rte. 2 North, Box 107, Pocatello, Id. 83202

[21] Appl. No.: 839,170

[22] Filed: Mar. 13, 1986

Related U.S. Application Data

[63] Continuation-in-part of Ser. No. 639,862, Aug. 13, 1984, abandoned.

[51] Int. Cl.⁴ ............................................. B65G 17/00
[52] U.S. Cl. .............................. 198/803.01; 198/822; 198/848
[58] Field of Search ........... 198/648, 698, 699, 803.01, 198/818, 820, 822, 834, 836, 848, 850; 209/307, 308

[56] References Cited

U.S. PATENT DOCUMENTS

| | | | |
|---|---|---|---|
| 712,205 | 10/1902 | Poppenhusen | 198/848 |
| 2,096,105 | 10/1937 | Griffith | 198/803.01 |
| 2,732,631 | 1/1956 | Black | 198/848 |
| 3,587,829 | 6/1971 | Sorensen | 198/803.01 |
| 3,618,747 | 11/1971 | Hammond | 198/848 |
| 3,679,050 | 7/1972 | Anderson et al. | 198/698 |
| 3,767,034 | 10/1973 | Teagle | 198/848 |
| 4,023,671 | 5/1977 | Kramer | 198/699 |
| 4,031,825 | 6/1977 | Jaffa | 198/648 |
| 4,388,990 | 6/1983 | Michalik | 198/803.01 |
| 4,542,821 | 9/1985 | Livermore | 198/822 |

FOREIGN PATENT DOCUMENTS

| | | | |
|---|---|---|---|
| 889275 | 9/1953 | Fed. Rep. of Germany | 198/834 |
| 13404 | 5/1956 | Fed. Rep. of Germany | 198/820 |
| 2715108 | 10/1978 | Fed. Rep. of Germany | 198/850 |
| 6053 | of 1910 | United Kingdom | 198/834 |
| 726118 | 3/1955 | United Kingdom | 198/834 |

*Primary Examiner*—Robert J. Spar
*Attorney, Agent, or Firm*—Mallinckrodt & Mallinckrodt

[57] ABSTRACT

An endless, belted-chain conveyor as customarily employed in various types of agricultural crop-harvesting equipment is provided with elongate attachment devices for receiving and holding accessories designed to protect a harvested crop or other conveyed material from bruising contact with portions of the conveying surface of the conveyor, such as sprocket runs or with stationary side-walls of the conveyor. The attachment devices comprise elongate portions advantageously in the form of cantilevered tongues directed toward the longitudinal axis of the conveying reach of the conveyor and spaced from the conveying surface thereof sufficiently to receive protective accessories that are either attached to such cantilevered tongues or adapted to be so attached.

21 Claims, 12 Drawing Figures

ENDLESS, AGRICULTURAL, BELTED-CHAIN CONVEYOR WITH PROVISION FOR ATTACHING CROP-PROTECTING, SPROCKET-RUN COVERS

RELATED APPLICATION

The present application is a continuation-in-part of similarly entitled Application Ser. No. 639,862, filed Aug. 13, 1984, now abandoned.

BACKGROUND OF THE INVENTION

1. Field:

This invention is in the field of endless agricultural conveyors for crop harvestors and other equipment in which agricultural produce is moved from one location to another, and is particularly concerned with such conveyors as made up of an endless, longitudinal series of spaced rods secured at their opposite ends to transversely spaced, endless belts.

2. State of the Art:

Endless agricultural conveyors constructed of a series of spaced rods, usually of steel flattened at their ends and secured at such ends to endless belts of reinforced rubber or other elastomeric material for motivation by sprockets operative on such series of rods adjacent to the respective belts and inwardly of the conveyor, are well known and widely used. However, problems have long existed by reason of conveyed crop items being bruised or otherwise damaged by contact with and sometimes by becoming caught in the openings between rods. It is customary to cushion the rods by coating or covering them with rubber, but the sprocket runs at each side are normally left free. Also, in order to protect the crop being conveyed from contact with the stationary, crop-confining walls at opposite sides of the conveyor, shielding strips are often employed. Nonetheless, these expedients have been only indifferently successful.

3. Objective:

In the making of this invention, a primary objective was to protect the conveyed crop from contact and interengagement with the uncoated and uncovered sprocket runs of the conveyor and to provide for quickly and easily attaching protective shields for the conveyor side walls as removable and replaceable accessory equipment.

SUMMARY OF THE INVENTION

In the accomplishment of the foregoing objective, usually each but in any event many of the rod ends which are secured normally by riveting to the underlying belts have secured thereto, preferably in longitudinal alignment therewith, respective elongate attachment members, each having an elongate portion directed substantially toward the longitudinal axis of the conveying reach of the conveyor and spaced above the supporting surface of the conveyor. Such elongate portion may provide one member of a mating pair of mutually cooperative attachment members, which pair has effective shielding width relative to the rod portion that it overhangs during its travel with and in the crop-conveying reach of the conveyor, the other member of the pair including a shielding accessory having effective width and configuration for the purpose.

An opposite portion of the alongate attachment member is secured to the rod with which it is associated usually by the same rivets that attach the rod to the belt, and is normally but not necessarily flat so as to smoothly ride on any supporting rollers that may be provided for the return reach of the conveyor.

Useful accessories to be attached to the attachment member may be an upstanding finger, either rigid or flexible, to provide crop protection against conveyor side wall damage, a cushioning cover for the associated sprocket run, etc., as will be apparent to those concerned with conveying equipment of this type.

THE DRAWINGS

In the accompanying drawings, which illustrate various embodiments of the invention presently contemplated as the best mode of carrying out the invention in actual practice:

FIG. 1 represents a perspective view of one end of a standard type of endless, agricultural, belted-chain conveyor showing the conveyor rods equipped in accordance with the invention with provision, in the form of a tongue member of a mating pair of tongue and socket members, for attaching crop-protecting accessories;

FIG. 2, a fragmentary top plan view of the conveying reach of FIG. 1, with the rods equipped as indicated;

FIG. 3, a transverse vertical section taken on the line 3—3 of FIG. 2;

FIG. 4, a longitudinal vertical section taken on the line 4—4 of FIG. 2;

FIG. 5, a view corresponding to the lefthand portion of FIG. 3, but showing how upstanding, rigid, finger attachments may be fitted into place on respective tongue members by snap-locking thereon as protection against sideboard contact and showing the conveyor rods with oversize cushioning sleeves thereon;

FIG. 6, a vertical section taken on the line 6—6 of FIG. 5 and drawn to a larger scale;

FIG. 7, an enlarged fragmentary view corresponding to a portion of FIG. 5 but showing an alternative way of securing the accessory to the tongue member of the mating pair;

FIG. 8, a view similar to that of FIG. 5, but illustrating a flexible finger;

FIG. 9, another view similar to that of FIG. 5, but illustrating a flat, sprocket-run-protective cover as an attachment to the tongue member;

FIG. 10, a view similar to FIG. 7, showing another embodiment of the invention;

FIG. 11, a view similar to that of FIG. 5, but taken with respect to an embodiment of the invention wherein the protective accessory is vulcanized to the tongue member prior to affixing of the tongue member to a rod of the conveyor chain; and FIG. 12, a vertical section taken on the line 12—12 of FIG. 11.

DETAILED DESCRIPTION OF THE ILLUSTRATED EMBODIMENTS

Figure 1:
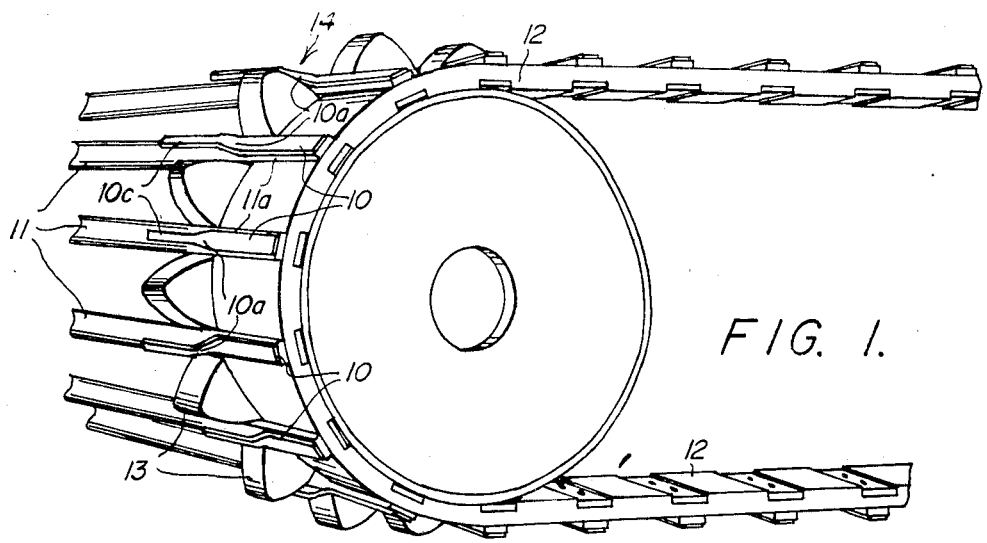
Figure 2:
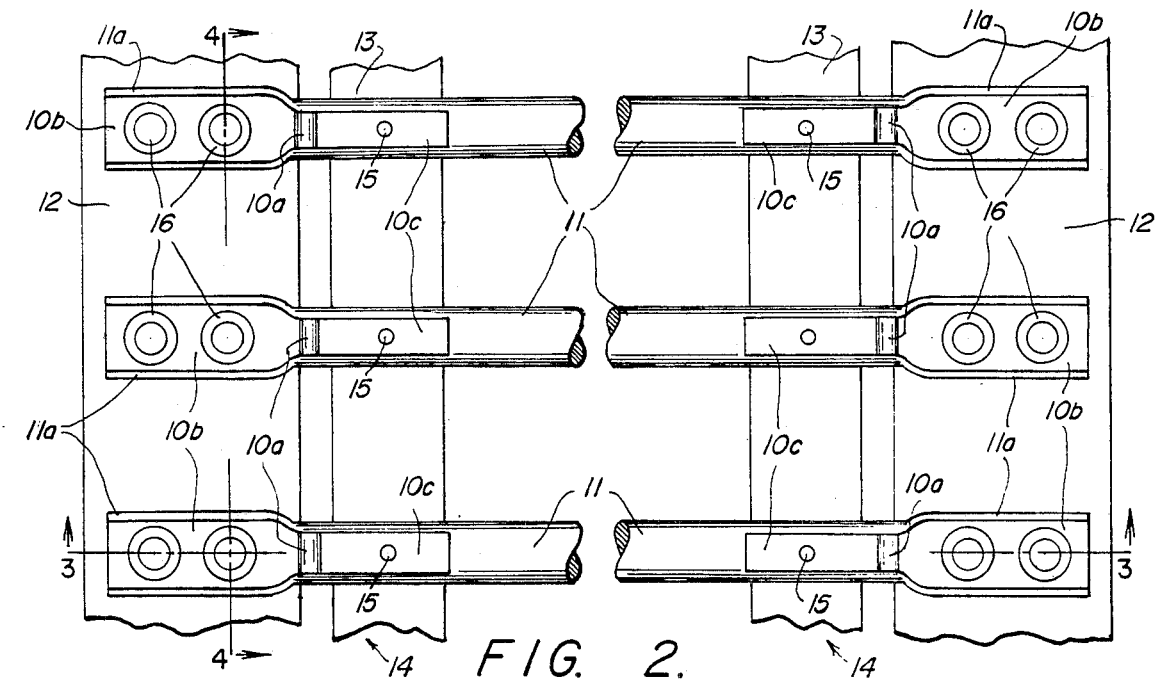
Figure 3:
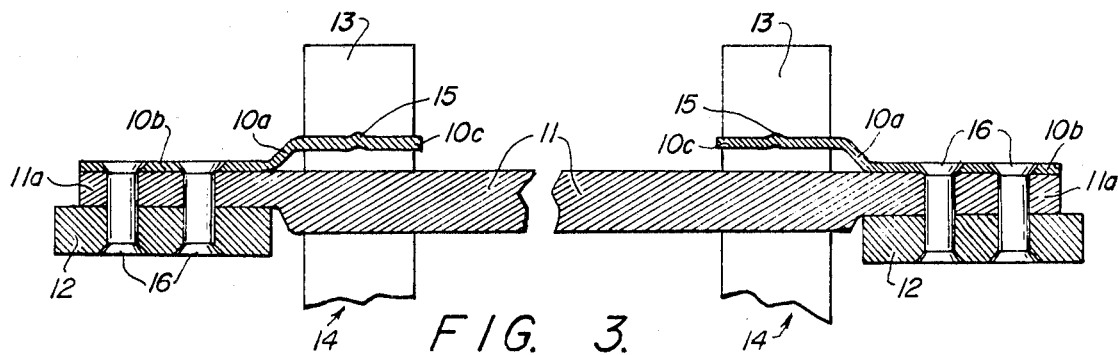
Figure 4:
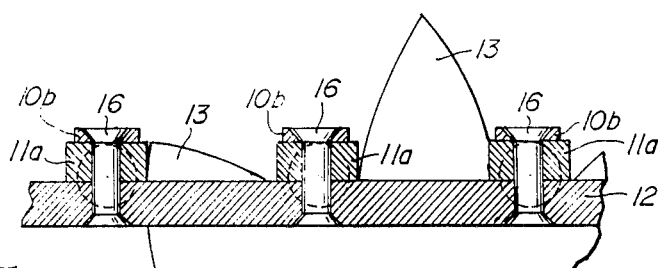

As illustrated in FIGS. 1–4, attachment means in the form of attachment members 10 of mating pairs of mutually cooperative attachment members (see FIGS. 5–8) are fastened to opposite end portions 11a, respectively, of conveyor chain rods 11 that are mutually spaced as a series extending longitudinally of transversely spaced, relatively narrow, endless belts 12 to provide a well-known type of endless, agricalatural, belted-chain conveyor motivated by sprocket wheels 13 operating within sprocket runs 14 in the usual manner.

It is the combination of attachment means, e.g. the attachment members 10, providing for the installation of various types of crop-protective accessories, see FIGS. 5-12, with the conventional belted chain conveyor that constitutes the basic concept of the present invention.

In the illustrated instances of FIGS. 5-10, the attachment members 10 are each provided in the form of an elongate strip, usually of metal such as steel, bent intermediate its length to provide an angled portion 10a between mutually offset rod attachment portion 10b and an elongate portion 10c in the form of a cantilever tongue directed toward the longitudinal axis of the conveying reach of the conveyor and overhanging the conveying surface of the conveyor, usually the associated sprocket run 14 of the conveyor, so as to receive a mated member forming part of a crop-protective accessory, as in FIGS. 5-10. For retaining the mated member in place on a snap-fit basis, such cantilever tongue portion 10c may be provided with a detent member, here shown as a dimple 15, although other methods of securing the mated member in place may be employed making it unnecessary to provide detent members, see FIG. 7, as described hereinafter.

The attachment members 10 are desirably fastened both to the corresponding rod ends 11a, which are customarily flattened, and to the belts 12 by means of the same rivets 16 that are customarily used to fasten such rod ends to the belts, although other fastening arrangements could be used. This means that the members ride quite smoothly on any idler rollers that may be provided to support the return reach of the belted-chain.

The tongue portion 10c may be somewhat narrower than the underlying portion of the conveyor rod 11, since it will normally receive a crop-protective accessory. However, in some instances such tongue portion may be made wider so as to itself serve as a crop-protective cover for the corresponding sprocket run 14 should no accessory be required for particular instances of use.

Figure 6:
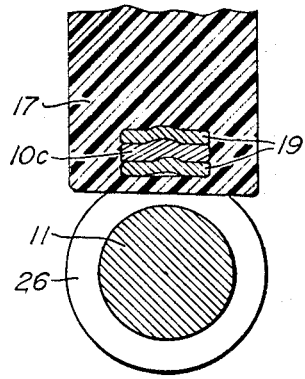
Figure 5:
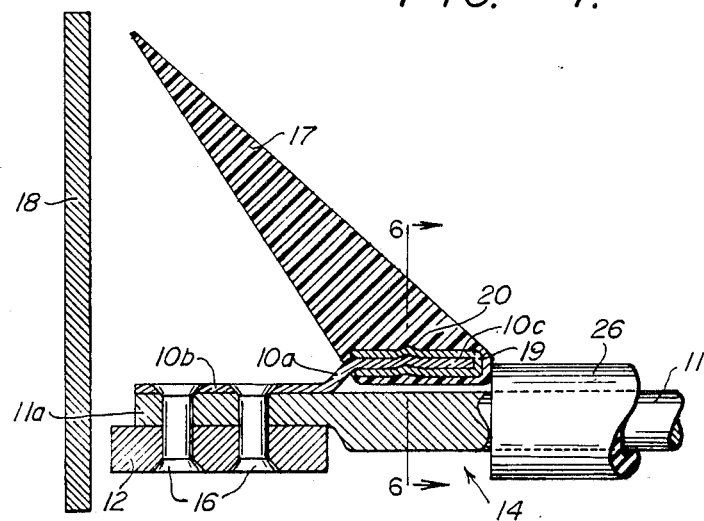

The crop-protective accessories may be of various types and materials. As shown in FIGS. 5 and 6, diagonally upstanding, crop-protective fingers 17 for keeping a crop from contacting the usual stationay sideboards 18 of the conveyor may be molded of plastic, elastomeric, or other material about a member 19 of generally U-formation adapted to mate with a tongue portion 10c of an attachment member 10. For example, member 19 may be bent to shape from a metal strip and provided with a detent recess 20 for snap action with the dimple 15 of a tongue 10c in snap-latching a finger 17 to an attachment member 10. As so formed, the accessory is recessed and the recess is lined interiorly with rigid material, i.e. by member 19.

Instead of detents, other securing arrangements may be utilized. For example, a normally upper leg of the U-formed attachment member 19 may be extended, as 19a, FIG. 7, and bent down after installation of the accessory to lie flat against the angled or bend portion 10a of attachment member 10.

Figure 8:
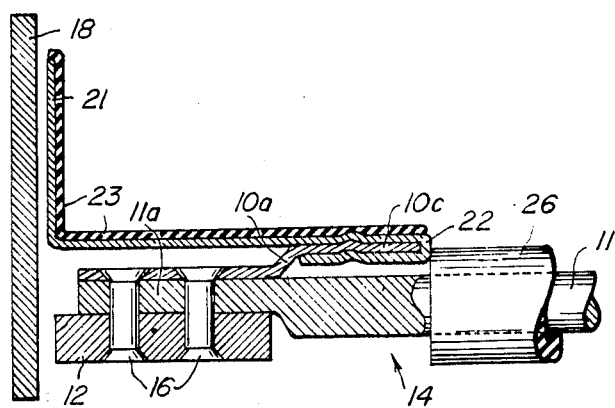

Again, such a finger may be formed vertically, as at 21 in FIG. 8, from an elongated leg 22a of a U-formed accessory 22 which is snap-latched to the tongue portion 10c of an attachment member 10. The outer end portion of leg 22a is bent upwardly at approximately a right angle to provide finger 21 and protect the conveyed crop against conveyor side-wall contact. Cushioning materal 23 is advantageously applied to the entire length and free end of leg 22a, as shown, to protect against crop bruising. This arrangement provides greater carrying capacity for the conveyor than does the arrangement of FIG. 5.

Figure 9:
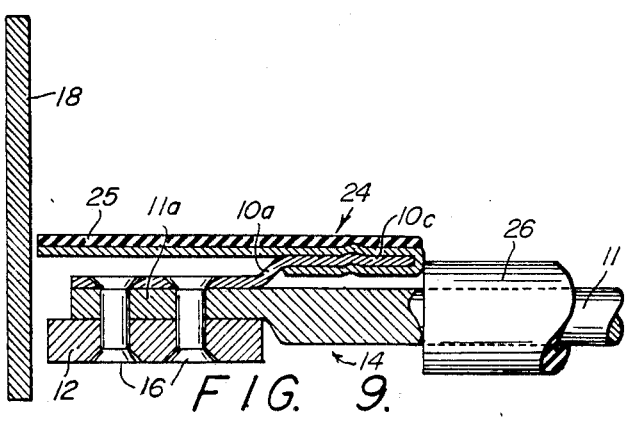

A somewhat similar arrangement is shown in FIG. 9 wherein an accessory 24 covers only the corresponding sprocket run and riveted end of the associated conveyor bar with cushioning pads 25.

The foregoing are merely examples of the various ways in which crop-protecting accessories can be fabricated for convenient attachment to attachment means provided on the usual belted-chain conveyor for agricultural or other use.

The conveyor rods in a usual agricultural belted-chain conveyor normally carry close-fitting sleeves of elastomeric cushioning material to protect against crop damage. With the present invention, an additional advantage is obtained in that the internal diameters of such sleeves, see the sleeves 26, FIGS. 5-10, may be made slightly oversize so the sleeves can be easily slipped on and off the rods for replacement purposes. Such sleeves are of length such that their opposite ends are positioned closely, if not actually abutting, the respective protective accessories, so the sleeves are prevented thereby from sliding into the sprocket runs of the conveyor.

Figure 10:
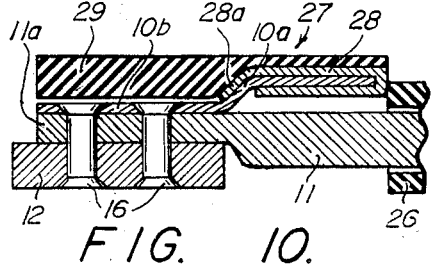

The embodiment of FIG. 10 shows how an accessory 27 may be provided and effectively retained on the cantilevered tongue 10c of an attachment member 10. A U-shaped member 28 is bent from a metal strip to conform to the shape of attachment member 10 and has a pad of cushioning mater 29 applied to its normally upper surface, that portion of the pad overlying the rod attachment portion 10b of an attachment member 10 being very thick so as to substantially fill the space provided by the angled portion 28a of the bent strip.

Conveyors of the type concerned are also made for motivation by means of drive wheels engaging the undersurface of the belting, rather than sprocket teeth engaging the rods. In these instances, the so-called sprocket runs, as such, will not be present, but crop-protective accessories will be similarly mounted for keeping the conveyed crop from bruising contact with rod ends and with conveyor sideboards.

Figure 7:
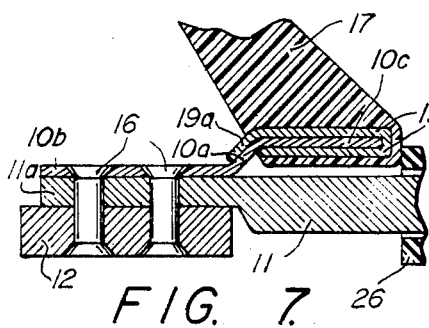
Figure 11:
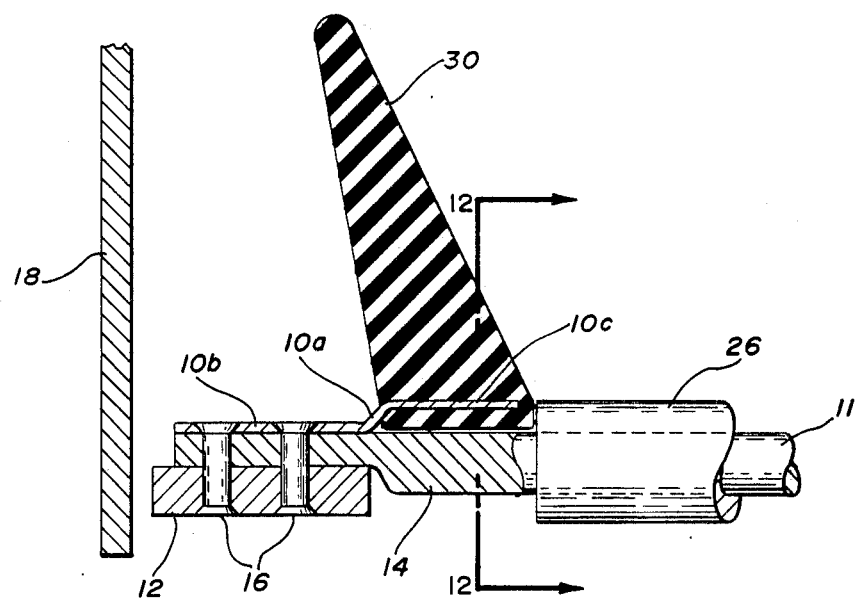
Figure 12:
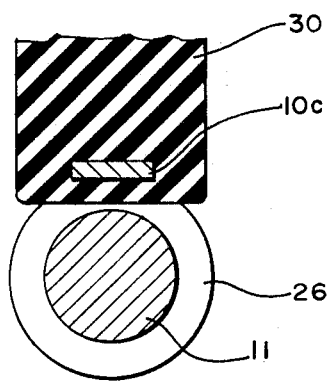

In instances of uses of a belted-chain conveyor of the type here concerned which require very secure attachment of the protective accessories to preclude displacement thereof during operation of the conveyor, it may not be practical to rely on unfixed mated attachment, as in the embodiment of FIGS. 1-6, 8 and 9, or even the more secure embodiments of FIG. 7 and 10. In such instances, the protective accessory may be formed on and fixedly secured directly to the raised and overhanging tongue portion 10c of the attachment member 10, as by vulcanization directly thereon in the case of an elastomeric protective accessory as shown in the embodiment of FIGS. 11 and 12.

There, elastomeric finger 30 corresponds to finger 17 of the embodiments of FIGS. 5 and 7, but is vulcanized directly to tongue portion 10c of attachment member 10. Finger 30 rises more steeply than does finger 17, so as to leave clearance above portion 10b of attachment member 10 for riveting of such portion 10b to bar 11 and belt 12 even though the finger is already attached to the attachment member. It should be noted that, even with finger 30 or any of the other forms of protective accessory initially fixedly fastened to attachment member 10 by vulcanization or otherwise, removal and replacement thereof can be carried out by removing and replacing the rivets 16 or other fastening devices that might be used.

Regardless of whether the protective accessories are initially fixedly secured to the elongate portions of respective elongate attachment members, as by vulcanization directly thereon, or the accessory and attachment members are separately formed for mating attachment, they represent unique articles of manufacture that may be produced and sold independently of the conveyor as such, for installation on conveyors without same that had been previously acquired.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. The combination with an endless, belted-chain conveyor having an endless series of mutually parallel rods spaced longitudinally of the conveyor, extending between transversely spaced, relatively narrow belts to which opposite end portions of the rods are fastened, and providing a supporting conveying surface, of attachment means for accessory, protective means, said attachment means comprising elongate attachment members fastened to said opposite end portions of respective rods and extending longitudinally of said rods, with elongate portions thereof directed substantially toward the longitudinal axis of the conveying reach of the conveyor and spaced above the supporting conveying surface of said conveyor sufficiently to accomodate respective protective means.

2. The combination set forth in claim 1, wherein the opposite end portions of the rods are flattened and fastened to the belts by riveting thereto, and wherein the elongate attachment members are fastened to said end portions of the rods by the rivets which fasten said end portions to the belts.

3. The combination set forth in claim 1, wherein the elongate portions of the elongate attachment members are formed as tongues adapted to mate with receiving recesses of respective protective means.

4. The combination set forth in claim 3, wherein the tongues are cantilevered portions of the attachment members.

5. The combination set forth in claim 4, wherein the elongate attachment members are rigid strips angled intermediate their lengths to provide the cantilevered tongue portions and oppositely extending, offset, conveyor-securement portions.

6. The combination set forth in claim 5, wherein the cantilevered tongue portions are provided, respectively, with detent means for securing the protective means.

7. The combination set forth in claim 1, including protective means attached to the elongate portions of the elongate attachment members.

8. The combination set forth in claim 7, wherein the protective means are upstanding fingers extending upwardly of the corresponding belt to a height that will prevent conveyed material from riding against conveyor stationary sidewalls.

9. The combination set forth in claim 8, wherein the fingers have receiving recesses positioned over the sprocket runs and of respective widths tending to prevent conveyed material from contacting or catching between end portions of mutually adjacent rods.

10. The combination set forth in claim 9, wherein the fingers are made of or covered with a cushioning material.

11. The combination set forth in claim 7, wherein the protective means comprises substantially horizontal pads of cushioning material having widths tending to prevent conveyed material from contacting or catching between end portions of mutually adjacent rods.

12. The combination set forth in claim 7, wherein intermediate portions of the rods between the opposite end portions are covered by sleeves of cushioning material having oversize internal diameters.

13. The combination set forth in claim 12, wherein opposite ends of the sleeves are closely adjacent to the attachment portions of the respective protective means.

14. The combination set forth in claim 7, wherein the elongate attachment members are rigid strips angled intermediate their lengths to provide cantilevered tongue portions adapted to mate with receiving recessed portions of respective protective means, and wherein the protective means each comprises material conforming to the shape of the corresponding angled strip and substantially filling the space provided by the angled portion of said corresponding angled strip.

15. The combination set forth in claim 7, wherein each protective means is separately formed to mate with the elongate portion of the corresponding elongate attachment member.

16. The combination set forth in claim 7, wherein each protective means is fixedly attached to the elongate portion of the corresponding elongate attachment member.

17. The combination set forth in claim 16, wherein the protective means is an upstanding finger that provides room above other portions of the elongate attachment member to facilitate riveting thereof to a conveyor rod and belt.

18. An article of manufacture for securement to an endless, belted-chain conveyor, comprising an elongate attachment member for a protective means, said member being formed as a rigid strip angled intermediate its length to provide an elongate cantilevered tongue portion and an oppositely extending, offset, conveyor-securement portion; and a protective means formed for attachment to said cantilevered tongue portion.

19. An article of manufacture as set forth in claim 18, wherein the protective means is formed of an elastomer material fixedly vulcanized directly to the cantilever tongue portion of the attachment member.

20. An article of manufacture as set forth in claim 18, wherein the protective means is formed of cushioning material recessed for mating reception of the cantilever tongue portion of the attachment member, the recessed portion being lined interiorly with rigid material provided with fastening means for said cantilever tongue.

21. An article of manufacture as set forth in claim 18, wherein the protective means is attached to the cantilevered tongue portion.

* * * * *